United States Patent [19]
Wilcox

[11] Patent Number: 5,806,564
[45] Date of Patent: Sep. 15, 1998

[54] NO SPILL COUPLING

[75] Inventor: Wayne Wilcox, Waterford, Pa.

[73] Assignee: Snap-Tite Technologies, Inc., Wilmington, Del.

[21] Appl. No.: 984,470

[22] Filed: Dec. 3, 1997

[51] Int. Cl.⁶ ................................................ F16L 29/00
[52] U.S. Cl. .............................. 137/614.05; 137/614.04; 137/614
[58] Field of Search .............................. 137/614.05, 614, 137/614.03, 614.04, 614.01, 614.02, 512, 512.5, 513

[56]        References Cited
        U.S. PATENT DOCUMENTS

| | | | |
|---|---|---|---|
| 3,236,251 | 2/1966 | Hansen | 137/614.05 |
| 3,464,436 | 9/1969 | Bruning | 137/614.03 X |
| 3,550,624 | 12/1970 | Johnson | 137/614.05 X |
| 4,200,121 | 4/1980 | Walter et al. | 137/614.05 |
| 5,730,185 | 3/1998 | Wilkins et al. | 137/614.05 X |

Primary Examiner—Kevin Lee
Attorney, Agent, or Firm—Wooding, Krost & Rust

[57] ABSTRACT

The invention is a coupling which includes male and female portions thereof. The male portion usually has pressure applied to it due to heat build up from the environment. The male portion can be and usually is attached to a farm implement. Left in a field in the sun, pressure builds in the male portion while it is disconnected from the female portion. The female portion of the coupling enables the connection of the male portion without spilling any fluid from either the male or the female portions. This is accomplished by the simultaneous engagement of the body of the male and the male valve with an intermediate member of the female portion and the female valve of the female portion such that the female valve and the intermediate member move together into a sealed relationship with the male components. When the supply side female portion is pressurized by a pump the female valve forces the female and male valves to their open positions and allows flow between the female and male portions of the coupling.

3 Claims, 4 Drawing Sheets

NO SPILL COUPLING

FIELD OF THE INVENTION

The invention disclosed herein relates to couplings used on agricultural implements, namely, tractors. The female portion of the coupling is typically mounted on the tractor. The female portion of the coupling mates with a male portion and fluid flows therethrough to power auxiliary equipment. This invention is directed toward a coupling of the no spill type which may be connected while the male portion is under pressure.

The female portion of the coupling may or may not be pressurized in the uncoupled condition. The pressure source to the female portion of the coupling is isolated when the coupling is disconnected. Sometimes, however, pressure is trapped between the isolation valves and the conduit leading to the female portion of the coupling in the disconnected/ uncoupled state. The male portion of the coupling is typically pressurized as the pressure generated by the fluid is trapped within the coupling upon disconnection from the female. Further, the pressure typically builds within the male portion of the coupling due to environmental conditions, namely, the introduction of heat to the fluid trapped within the male portion of the coupling.

U.S. Pat. No 3,431,942 to Kopaska is a coupler for releasably connecting a pair of conduits one or both of which may contain hydraulic fluid under pressure. Kopaska has a ball check in each of the male and female portions thereof. It is desirous to prevent back flow checking. The female portion of the instant invention has a mechanical feature that once it is fully connected and sequenced it will lock the female valve in the open position thus preventing back flow checking.

SUMMARY OF THE INVENTION

The instant invention provides a coupling wherein the male portion thereof may be interconnected to the female portion thereof by hand. The male portion includes a body and a male valve which engage a female portion which includes an intermediate member and a female valve. The male valve and body engage the female valve and intermediate member and simultaneously urge both female parts from their first positions to their second positions. The female intermediate member and female valve move in unison such that the male and female members are sealed. When the male portion of the coupling enters the female portion, the female valve is urged toward its second position and the intermediate member is urged toward its second position. When the intermediate member and the female valve are in their second positions there is no flow between the female and male portions of the coupling.

Upon the application of pressure to the female portion of the coupling, while the male and female portions thereof are joined, the female valve experiences pressure on its inner face which causes the female valve to open against the face of the male valve thus establishing flow between the female and male portions of the coupling. A spring assists the female valve in opening against the male valve. When the female valve opens it returns to its first position. In its first position, the female valve is locked in the open position by the action of a detent member in combination with a locking collar and another spring. With the female valve locked in its open first position back flow checking is prevented.

It is an object of the present invention to enable the male portion to be connected to the female portion under pressure.

It is a further object of the present invention to enable the male portion of the coupling to be connected to the female portion of the coupling without spilling any of the fluid from either the male portion or the female portion.

It is a further object of the present invention to provide a coupling which prohibits back flow checking in the female portion thereof.

It is a further object of the present invention to provide a coupling in which pressurization of the female portions thereof opens a female valve and locks it in place against the pressure built up in the male portion.

It is a further object of the present invention to provide a coupling wherein a locking collar in combination with a detent member prohibits the back flow checking of the female valve.

Other objects and a more complete understanding of the invention will be had when referring to the Brief Description of the Drawings, the Detailed Description of the Invention, and the claims found hereinbelow.

DETAILED DESCRIPTION OF THE INVENTION

Figure 1:
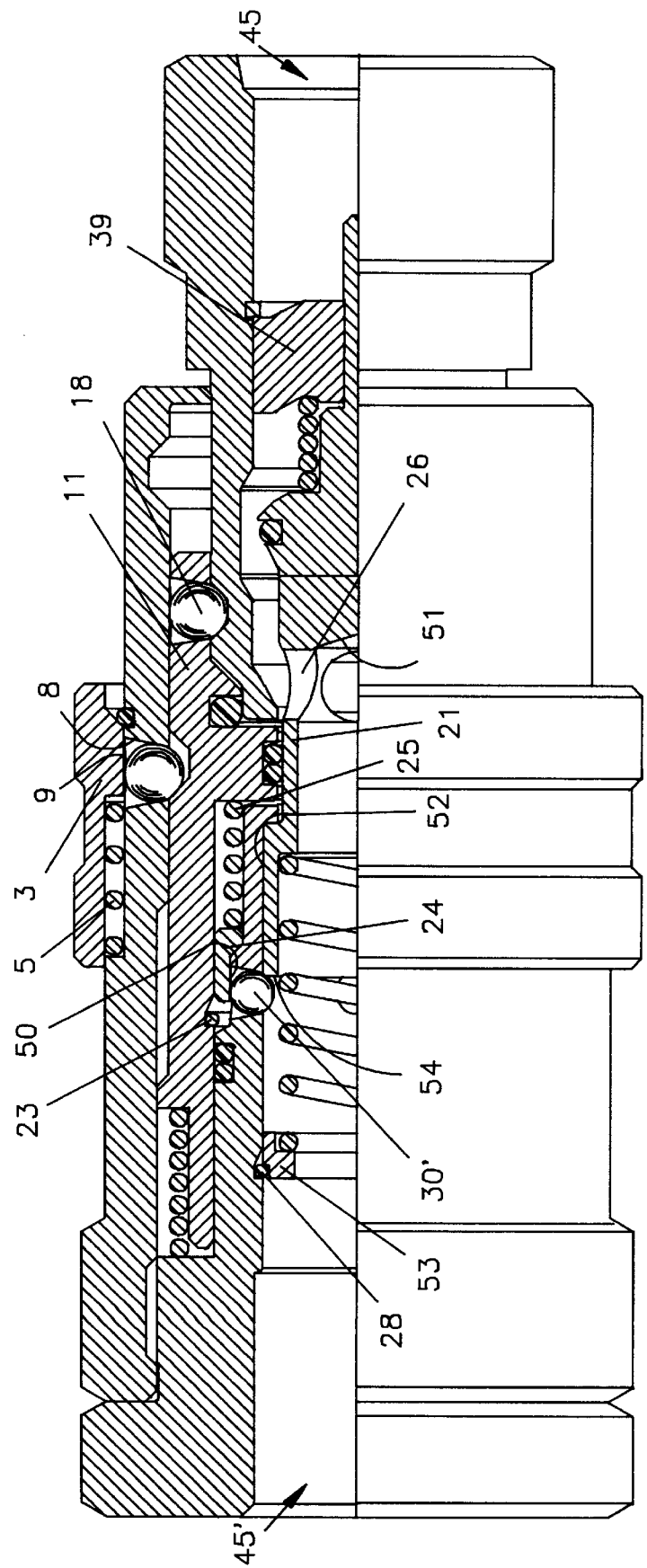
FIG. 1 is a quarter-sectional view of the male and female portions of the coupling in their coupled condition with the male and female valves in their open positions.
Figure 2:
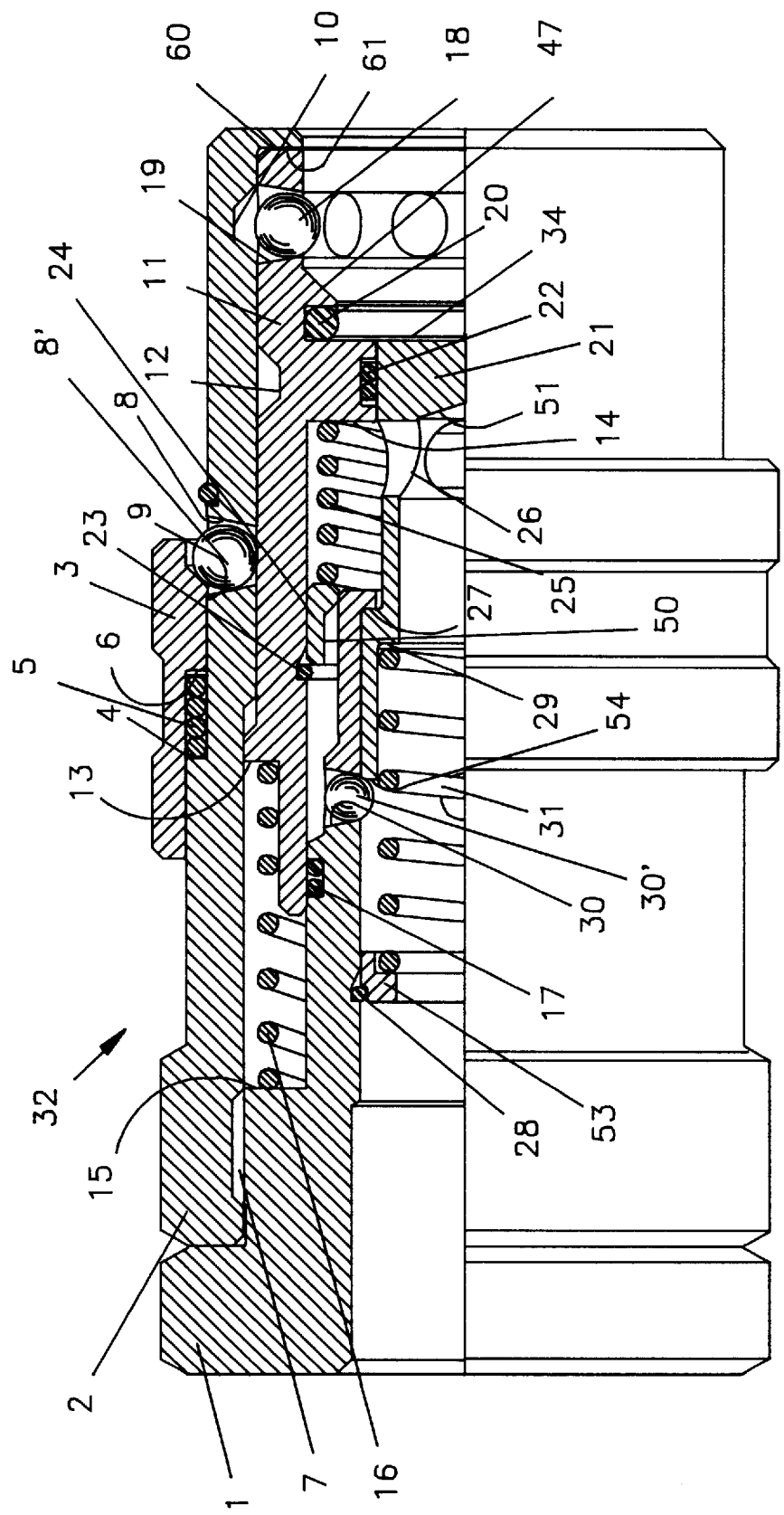
FIG. 2 is a quarter-sectional view of the female portion of the coupling in its uncoupled condition.

FIG. 2 is a quarter-sectional view of the female portion of the coupling in its uncoupled state. Reference numeral 32 indicates the female portion of the coupling. Adaptor 1 is threaded to body 2. Reference numeral 7 indicates the threaded interconnection between the adaptor 1 and body 2. Body 2 includes a plurality of apertures 8 therein. Detent members 8' reside in apertures 8 of body 2. Body 2 includes an exterior shoulder 4. Locking sleeve 3 resides about body 2 and spring 5 acts between shoulder 4 and locking sleeve 3. Locking sleeve 3 includes surface 9 thereon which locks detent member 8' as shown in FIG. 1. Spring 5 acts between shoulder 6 on the locking sleeve 3 and shoulder 4 on body 2. As shown in FIG. 2 which is the uncoupled condition of the female portion of the coupling, spring 5 urges locking sleeve 3 into engagement with detent members 8'. It will be understood by those skilled that there can be a plurality of detent members 8' which are situated in any one of a plurality of apertures 8 which are spaced circumferentially around the generally cylindrical body 2. It will be understood by those skilled in the art that the female portion 32 of the coupling is generally cylindrically shaped.

FIG. 2 illustrates the intermediate member 11 and the female valve 21 in their first positions. Referring still to FIG. 2, intermediate member 11 includes a recess 12 for receiving detent members or balls 8' at the appropriate time to be discussed hereinbelow. Similarly body 2 includes a recess 10 for receiving detent members or balls 18 when the male portion of the coupling is disconnected from the female portion of the coupling. Detent members 18 are housed in a plurality of apertures 19 in the intermediate member 11. Body 2 carries elastomeric seals 20 in a circumferentially extending groove for sealing the male and the female members when they are coupled or interconnected. Similarly the intermediate member 11 carries elastomeric seals 22 therein for sealing against the female valve 21.

Referring again to FIG. 2 intermediate member 11 includes an exterior shoulder 13 and spring 16 acts between shoulder 13 and shoulder 15 on adaptor 1. Spring 16 tends to urge the intermediate member 11 away from shoulder 15 on adaptor 1.

Intermediate member 11 includes snap ring 23 which resides in a groove therein. Snap ring 23 restrains locking collar 24 from movement leftwardly when viewing FIG. 2. Locking sleeve 24 is acting under the influence of spring 25 which resides between locking collar 24 and interior shoulder 14 on the intermediate member 11.

Referring still to FIG. 2 elastomeric seals 17 reside in a groove in the adaptor 1. Adaptor 1 further includes conical apertures 30 which are circumferentially spaced about said generally circumferentially shaped adaptor 1. It will be observed by those skilled in the art that adaptor 1 is generally circumferentially shaped meaning it has various surfaces which have various circumferential diameters. Detent members 30' reside in conical apertures 30. It should be mentioned that with respect to the apertures described in the body 2, namely, the apertures 8 that they are also conical apertures. Similarly, the apertures 19 and the intermediate member 11 are also conically shaped.

Female valve 21 includes apertures 26. There are a plurality of apertures 26 which enable flow from within the female valve 21 to its exterior in certain circumstances. In FIG. 2, the uncoupled state, there is no flow through the apertures because there is no where for the hydraulic fluid or other medium to go. The fluid is sealed from exiting the coupling by the seals 22 and seals 17 previously identified above. Adaptor 1 includes a snap ring 28 which reside in a groove therein. A snap ring 28 serves to restrain spring support 53 from axial movement in a leftward direction when viewing FIG. 2. Spring 31 resides between an interior shoulder 29 of the valve 21 and the spring support 53. As viewed in FIG. 2 spring 31 urges valve 21 against interior shoulder 27 on adaptor 1.

Referring to FIG. 2 it will be noticed that spring 31 positions female valve 21 against shoulder 27 thus insuring that valve 21 is positioned in its first position whereby flow is not permitted past intermediate member 11. Intermediate member 11 is urged by spring 16 against body 2. See, the rightmost portion of FIGS. 2 and 4 wherein shoulder 60 on intermediate member 11 engages shoulder 61 on body 2.

Figure 3:
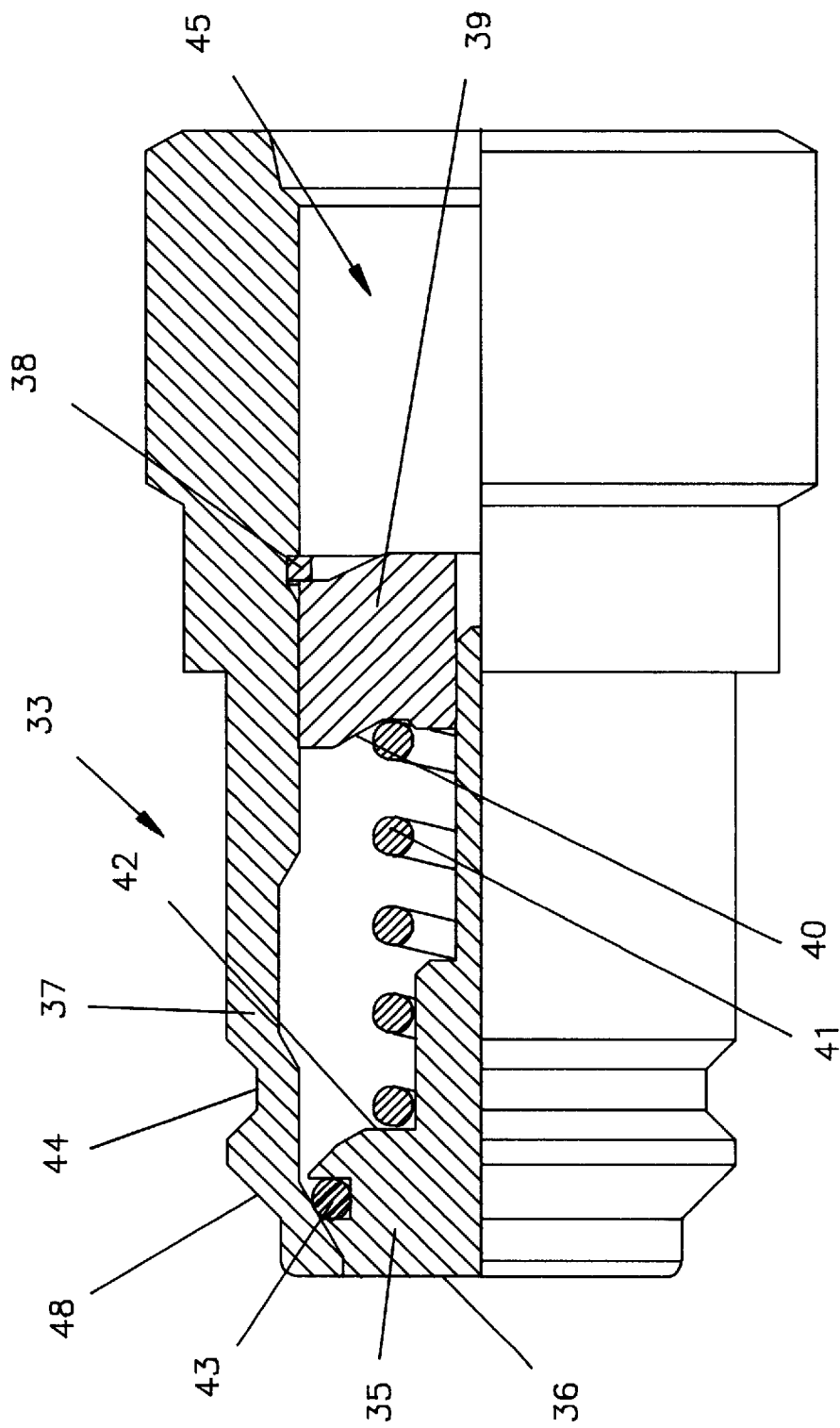
FIG. 3 is a quarter-sectional view of the male portion of the coupling in its uncoupled condition.

Referring to FIG. 3 a quarter-sectional view of the male portion of the coupling in its uncoupled condition is illustrated. Reference numeral 33 denotes the male portion of the coupling. Reference numeral 35 indicates the male valve of the male portion 33 of the coupling. Male valve 35 includes a face 36 which engages face 34 of female valve 21. See FIG. 2.

Referring again to FIG. 3, reference numeral 37 indicates a generally cylindrically shaped male body member. Snap ring 38 resides in a groove in body 37 of the male portion 33. Snap ring 37 serves to restrain the movement of stop 39 in the rightward direction when viewing FIG. 3. Stop 39 includes three legs one of which is shown in cross section. The fluid flows past stop 39 providing plenty of capacity for flow to the coupling when the coupling is fully coupled as shown in FIG. 1. In viewing FIG. 1 the flow of fluid is from the supply side or the left side of the illustration toward the right side of the coupling. Stop 39 serves as the support for spring 41 which acts on shoulder 42 of male valve 35. Seal 43 seals between the male valve 35 and the body 37 as shown in FIG. 3. Recess 44 is shown in the exterior of body 37 of the male portion and its purpose is to engage detents 18 of the female member as shown in FIG. 1 in the coupled condition.

In viewing FIG. 1 reference numeral 45' indicates the application of high pressure fluid from a source such as a pump. Reference numeral 45 in FIGS. 1 and 3 illustrate the passageway for the high pressure fluid which would be exiting to the right of the rightward portion of the male portion of the coupling toward a farm implement.

Figure 4:
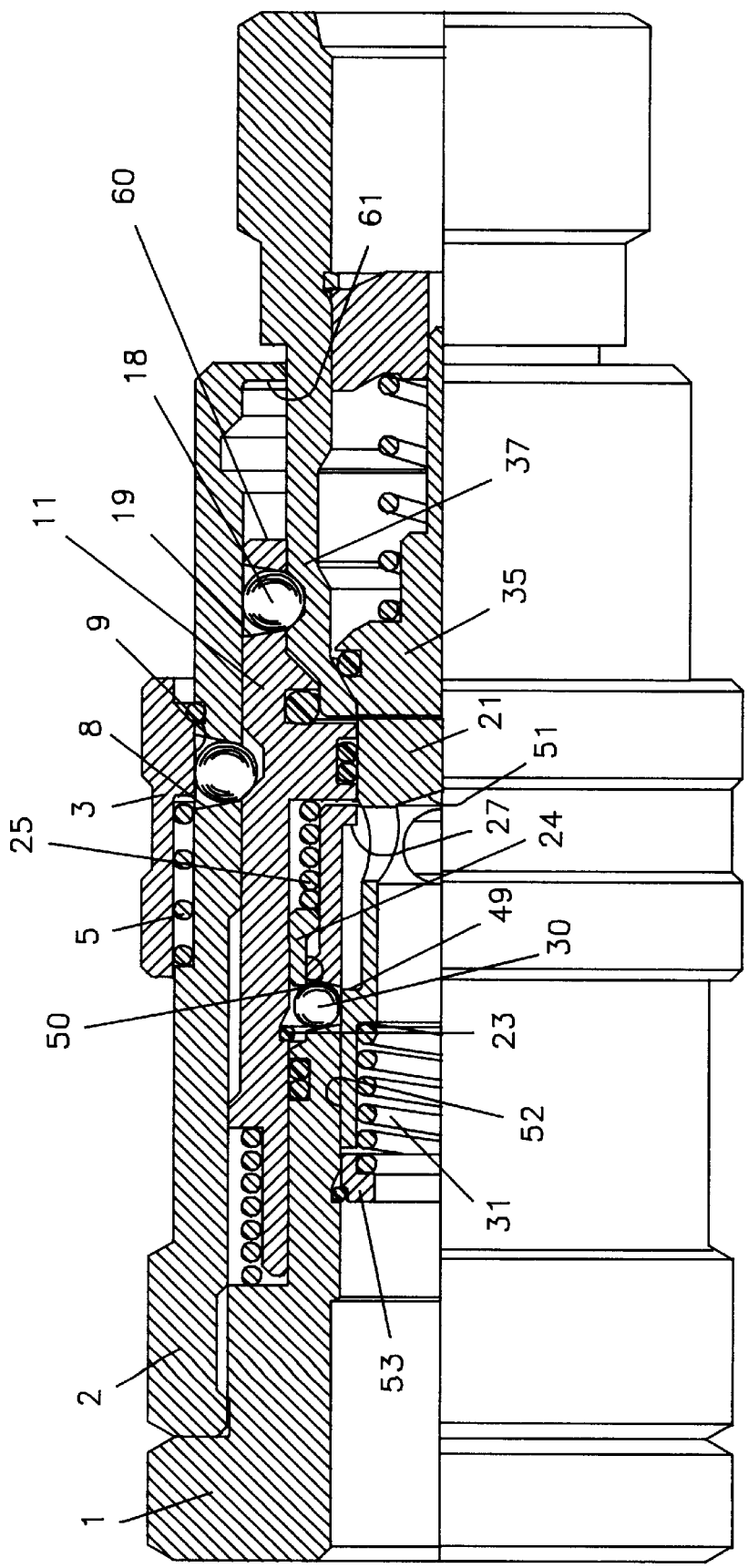
FIG. 4 is a quarter-sectional view of the male and female portions of the coupling coupled together but with the female and male valves closed before the pressurization of the female portion of the coupling.

When the male portion 33 of the coupling engages the female portion 32 of the coupling, engaging shoulder 48 of the male portion 33 engages the shoulder 47 of the intermediate member 11 of the female portion of the coupling and urges the intermediate portion 11 and the female valve 21 in a leftward direction as illustrated in FIG. 4. FIG. 4 is similar to FIG. 1 from the standpoint that the male body 37 has engaged the intermediate member 11 of the female portion and has pushed the intermediate member 11 in the leftward direction. In other words intermediate member 11 is in the same position in FIGS. 1 and 4. FIG. 1 illustrates the coupling after the pressurization of the female portion with high pressure hydraulic fluid or another medium. Pressurization of the female portion of the coupling results in the rightward movement of the female valve 21 such that female valve 21 and male valve 35 are opened. This enables flow through female valve 21 and past male valve 35 to supply the implement. When the female portion is pressurized the surface area denoted generally by reference numeral 51 is subjected to high pressure hydraulic fluid and together with the force of spring 31, the female valve 21 exerts a force in the rightward direction on the female valve and overcomes the force of the spring 41 and the fluid pressure acting on the valve 35 of the male. This causes the female valve 21 to shuttle rightwardly which allows the detent members 30 to drop downwardly in combination with the urging of the locking collar 24 by virtue of the spring 25 acting between the intermediate member 11 and the locking collar 24. As shown in FIG. 1 locking collar 24 includes surface 50 which ensures that detent members 30' are secured toward the bottom of aperture 30. In FIG. 1 exterior shoulder 49 of female valve 21 is secured against shoulder 27 of the adaptor 1. Reference numerals 49 and 27 are best viewed in FIG. 4.

FIG. 4 illustrates the condition where little or insufficient pressure is applied to the female portion of the coupling. The coupling is technically coupled in that it will not come apart absent retraction of locking sleeve 3. The female valve 21 includes an exterior surface 52 upon which balls or detent members 30 reside when there is insufficient pressure on the female portion of the coupling. See, FIG. 1. When the female portion of the coupling is pressurized as shown in FIG. 1 it will be noticed that the balls or detent members 30' serve to lock or secure the female valve 21 against movement in the leftward direction. The detent members 30' engage the end 54 of the female valve 21.

Referring to FIG. 4 this is the condition that exists upon coupling the male portion to the female portion. In FIG. 4 the male is secured to the female by virtue of the detent balls or detent members 18. Additionally, the intermediate member 11 is secured in position with respect to the body 2 by virtue of the detent members 8'. Surface 9 of locking sleeve 3 secures the detent members 8' into engagement with the intermediate member 11 by virtue of spring 5 acting between the body and the locking sleeve 3. In FIG. 4 the intermediate member 11 is shown in its second position as is the female valve 21. In FIG. 2 the intermediate member 11 and the female valve 21 are both illustrated in their first positions. In FIG. 1 the intermediate member 11 is illustrated in its second position and the female valve 21 is illustrated in its first position. Therefore the sequencing that occurs with respect to the female valve 21 is as follows: in the uncoupled condition female valve 21 is in its first position; in the condition where the male portion coupling has been coupled to the female portion as illustrated in FIG. 4, the female valve 21 is in its second position as is the intermediate member 11; and, in the condition where the male portion and female portions of the coupling have been coupled together and where sufficient pressure has been applied to the female portion of the coupling as illustrated in FIG. 1, intermediate member 11 is in its second position and female valve 21 is in its first position.

This invention has been described in view of the embodiment illustrated in FIGS. 1–4 hereof. It will be appreciated by those skilled in the art that the teachings and novelty of the instant invention may take the form of several embodiments not shown or illustrated herein. Therefore the invention is intended not to be limited by the disclosure provided herein and instead shall be measured by the scope of the appended claims which follow.

What is claimed is:

1. A coupling comprising a female portion and a male portion, said female portion comprising an adaptor, a body, said adaptor being affixed to said body, an intermediate member, said intermediate member having a first position and a second position, a female valve, said female valve having a first position and a second position, said male portion comprising a male valve and a body, said male valve and said male body engage said female valve and said intermediate member during coupling and simultaneously urge said female valve and said intermediate member from their first positions into their second positions, and, upon the application of pressure within said female coupling said female valve is forcibly urged to its said first position opening said female valve and said male valve permitting flow between said female and said male portions of said coupling.

2. A coupling as claimed in claim 1 wherein said female portion further comprises a locking collar and a detent member, said locking collar in combination with said detent member secure said female valve in said first position.

3. A coupling as claimed in claim 2 wherein said female portion further comprises a spring acting between said intermediate member and said locking collar urging said locking collar against said adaptor.

\* \* \* \* \*